(12) United States Patent
Lan et al.

(10) Patent No.: US 6,256,837 B1
(45) Date of Patent: Jul. 10, 2001

(54) HINGE ASSEMBLY FOR CAR-MOUNTED VIDEO DISPLAY UNIT

(75) Inventors: Peter J. T. Lan; Chia I Tsui, both of Claremont, CA (US)

(73) Assignee: USA Spec, Inc., City of Industry, CA (US)

( * ) Notice: Subject to any disclaimer, the term of this patent is extended or adjusted under 35 U.S.C. 154(b) by 0 days.

(21) Appl. No.: 09/478,034

(22) Filed: Jan. 5, 2000

(51) Int. Cl.⁷ .............................. E05D 11/10; E05D 3/10
(52) U.S. Cl. .................. 16/334; 16/367; 16/371; 16/386; 248/917; 248/921
(58) Field of Search ............... 16/367, 366, 331, 16/334, 371, 374, 386; 248/917, 919, 920, 921; 348/837; 353/13

(56) References Cited

U.S. PATENT DOCUMENTS

| | | | |
|---|---|---|---|
| 1,687,174 | * 10/1928 | Mountford et al. | 16/334 |
| 2,754,537 | * 7/1956 | Rose et al. | 16/367 |
| 2,922,669 | * 1/1960 | Hansen | 16/334 |
| 4,718,127 | * 1/1988 | Rittmann et al. | 16/334 |
| 4,829,633 | * 5/1989 | Kassner | 16/334 |
| 5,205,017 | * 4/1993 | Wang | 16/367 |
| 6,019,332 | * 2/2000 | Sweere et al. | 248/284.1 |
| 6,036,050 | * 3/2000 | Ruane | 16/334 |
| 6,059,255 | * 5/2000 | Rosen et al. | 248/917 |
| 6,157,418 | * 12/2000 | Rosen | 248/921 |

* cited by examiner

Primary Examiner—Chuck Y. Mah
(74) Attorney, Agent, or Firm—Philip K. Yu (57) ABSTRACT

A hinge assembly for mounting a video display with a screen to the interior of an automobile is disclosed. The hinge assembly comprises an open shaft adapted to pivot the screen about a first axis, a rotate shaft adapted to pivot the screen about a second axis, transversal to the first axis, a click plate attached to at least one end of the rotate shaft, the click plate causing the rotate shaft to pivot with a plurality of stops to maintain stability of the video display, a stopper attached to at least one end of the rotate shaft, the stopper causing the rotate shaft to stop rotation at a predetermined angle. Another embodiment of the hinge assembly comprises an open shaft adapted to pivot the screen about a first axis, the open shaft having a recess, a rotate shaft adapted to pivot the screen about a second axis, transversal to the first axis, the rotate shaft being in contact with the open shaft at their recesses, the rotate shaft having at least one recess, wherein the recess on the open shaft allows the rotate shaft to rotate, the recesses on the rotate shaft allow the open shaft to rotate, the non-recess portion of the open shaft prevents the rotate shaft to rotate and the non-recess portion of the rotate shaft prevents the open shaft to rotate.

17 Claims, 8 Drawing Sheets fig.1 fig.2

HINGE ASSEMBLY FOR CAR-MOUNTED VIDEO DISPLAY UNIT

FIELD OF THE INVENTION

The present invention relates generally to hinge assemblies and more particularly to hinge assemblies for use with car-mounted video display units.

ART BACKGROUND

It has become quite common for owners of automobiles to make their experience on the road as comfortable as possible. The interior of an automobile is, in fact, becoming more home-like, or office-like, with modem amenities such as cup-holders, cell phone jacks, high fidelity stereo systems with tape players, compact disc ("CD") players, and CD changers. It is only a matter of time before cars, sports utility vehicles or mini-vans are installed with a television set, albeit not for the driver, but certainly for the passengers, to enjoy during a road trip.

With the proliferation of video games and digital video discs ("DVD"), a video display unit will enable the passengers, particularly children in the back seat, to further enjoy the ride. Some companies have begun promoted the term "Mobile Video." However, the technologies for video displays have not advanced for the automobile industry as much as the PC industry. Car-mounted video displays have requirements that typically cannot be fulfilled by the conventional computer and display industries, due to the special environment in which the video displays will have to operate. Mounting the video display is one barrier, as well as the dimension of the display unit. Conventional cathode-ray tubes ("CRT") remain quite bulky for automobile applications.

Recently, the problem is getting addressed by progresses made in the flat-panel display technology. While the size of the video display unit is more suitable for the interior of automobiles, the picture quality of the video display unit has also improved dramatically. Now it is more practical to install a flat-panel LCD video display for the interior of an automobile with reasonably good picture quality. The reduced size of the video display also prevents it from becoming a safety hazard by blocking the rear view of the driver.

An example of such a Mobile Video system can be found in an overhead console system available from Audiovox, designed for Chevy Tahoe, Model No. VOH641 or VOH642. While such a system can provide entertainment for movie, video and video games, it fails to provide flexible viewing angles for the backseat passengers. As can be appreciated by those skilled in the art, the viewing angle is quite important to LCD video displays, since the passenger may end up seeing a blank screen due to improper viewing angle, or due to interference from an external light source. Further, if there is only one passenger in the back seat, it will be desirable to be able to arrange the video display so that the lone passenger can get the most viewing pleasure. Also, if the passenger is a small child in the back seat, then the display may need to be adjusted downward for the child to view. The display unit from Audiovox fails to teach such features.

Another display unit is disclosed in the U.S. Patent issued to John Rosen, U.S. Pat. No. 5,946,055. While the Rosen patent teaches a display unit with a housing and a screen, it does not teach exactly how the screen can be pivoted around its second axis, i.e. B axis, as in its FIGS. 2 and 9. Neither does the Rosen patent teach the interrelationship of the A axis (moving the display unit between a stowed position and a deployed position) and the B axis (moving the deployed screen sideways). Furthermore, the hinge assembly and the display unit still pose some disadvantages in terms of protecting the screen while improving the stability of the video display unit. Additionally, there is no teaching with respect to how to keep the wiring untangled, as the screen unit may be continuously rotated in the same direction, i.e. beyond the 360-degree, by the unsuspecting viewer. These problems are not taught or addressed by the Rosen patent.

As will be appreciated by those skilled in the art upon reading the following disclosure, both the Rosen system and the Audiovox system fail to teach means to protect the screen unit, while the screen is deployed, from accidental or unintentional force-stowing.

Therefore, it is desirable to have a hinge assembly with means to protect its screen unit, while the screen is deployed, from such scenario.

It is also desirable to have a hinge assembly with means to improve the stability of the display, hence the picture quality, in view of the vibrations from the automobile.

These objects and advantages of the present invention will become more apparent after a consideration of the drawings and the detailed description of the invention which follows.

SUMMARY OF THE INVENTION

A hinge assembly for mounting a video display with a screen to the interior of an automobile is disclosed. The hinge assembly comprises an open shaft adapted to pivot the screen about a first axis, a rotate shaft adapted to pivot the screen about a second axis, transversal to the first axis, a click plate attached to at least one end of the rotate shaft, the click plate causing the rotate shaft to pivot with a plurality of stops to maintain stability of the video display, a stopper attached to at least one end of the rotate shaft, the stopper causing the rotate shaft to stop rotation at a predetermined angle.

Another embodiment of the hinge assembly comprises an open shaft adapted to pivot the screen about a first axis, the open shaft having a recess, a rotate shaft adapted to pivot the screen about a second axis, transversal to the first axis, the rotate shaft being in contact with the open shaft at their recesses, the rotate shaft having at least one recess, wherein the recess on the open shaft allows the rotate shaft to rotate, the recesses on the rotate shaft allow the open shaft to rotate, the non-recess portion of the open shaft prevents the rotate shaft to rotate and the non-recess portion of the rotate shaft prevents the open shaft to rotate.

DETAILED DESCRIPTION OF THE PREFERRED EMBODIMENT

Figure 1:
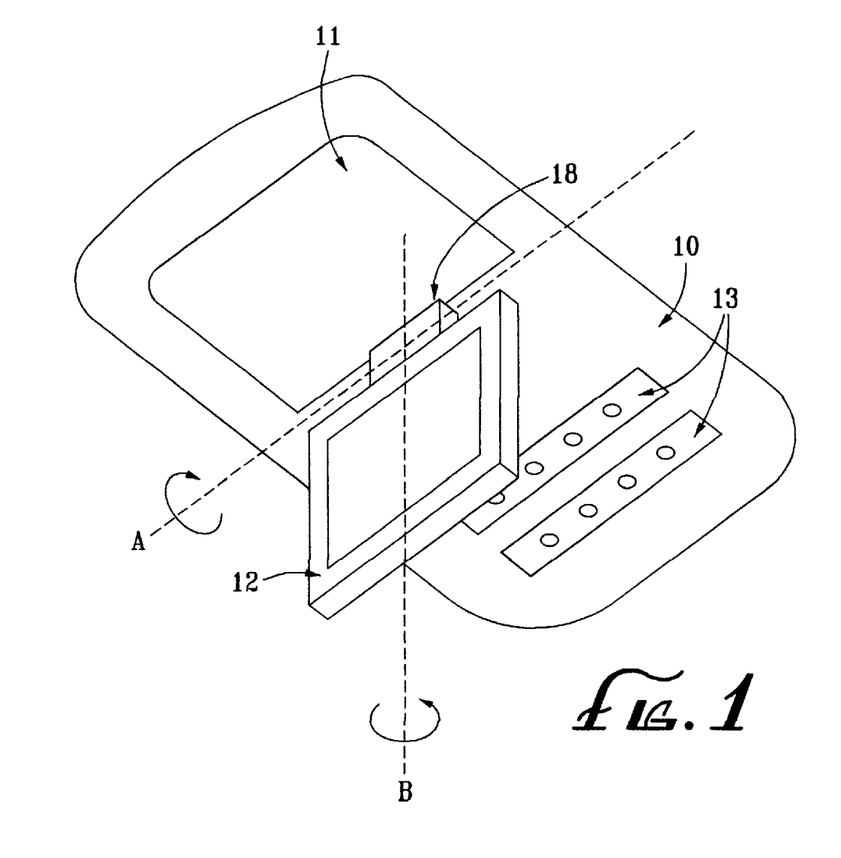
FIG. 1 shows a view of a display unit with a screen in a deployed position.
Figure 2:
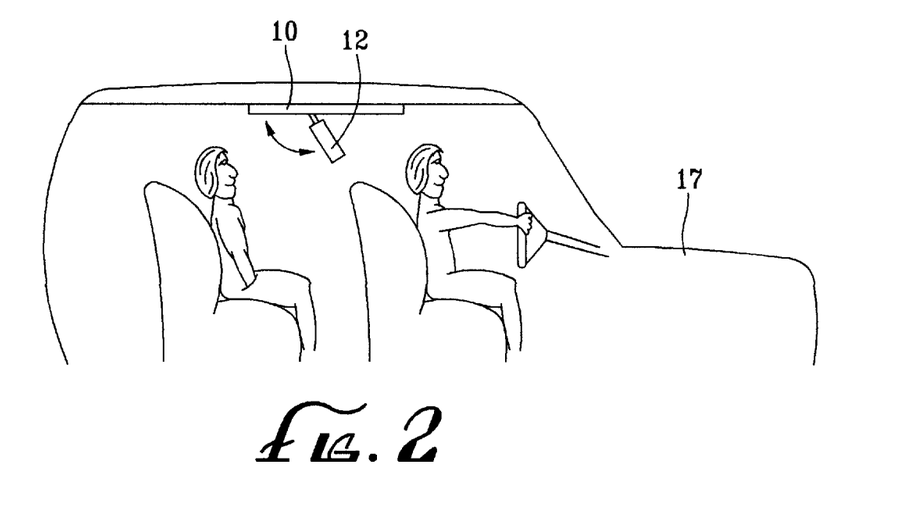
FIG. 2 is a simplified side view of a vehicle interior illustrating the use of the display unit.

Reference is to FIG. 1, where a simplified diagram showing the display console 10 with a screen unit 12 in a deployed position. The cavity 11 can be used to stow the screen unit 12 when the screen is not in use. Buttons 13 are used to control the operations of the screen unit 12. Having the control panel separated from the screen unit 12 has the advantage of reducing the size of the screen unit 12. The hinge assembly 18 in accordance with the present invention allows the screen unit 12 to be stowed or deployed about the A axis. And when the screen unit 12 is deployed (as shown), the hinge assembly allows movement about the B axis to provide better viewing angles, either due to the reflection caused by an external light source, or due to the position of the viewers. FIG. 2 is a simplified diagram showing the side view of a vehicle 17 with the screen unit 12 deployed for the passenger in the back seat.

While the display console 10 can be adapted to have its screen face the inside of the cavity 11 when it is stowed, those skilled in the art may find having the screen face out when stowed more desirable (as shown in the Rosen patent or in the Audiovox system). However, it should be apparent to those skilled in the art that it is easier to protect the screen unit from accidental scratches, baby food or damages when the screen is kept away from the passengers when not in use.

Figure 3A:
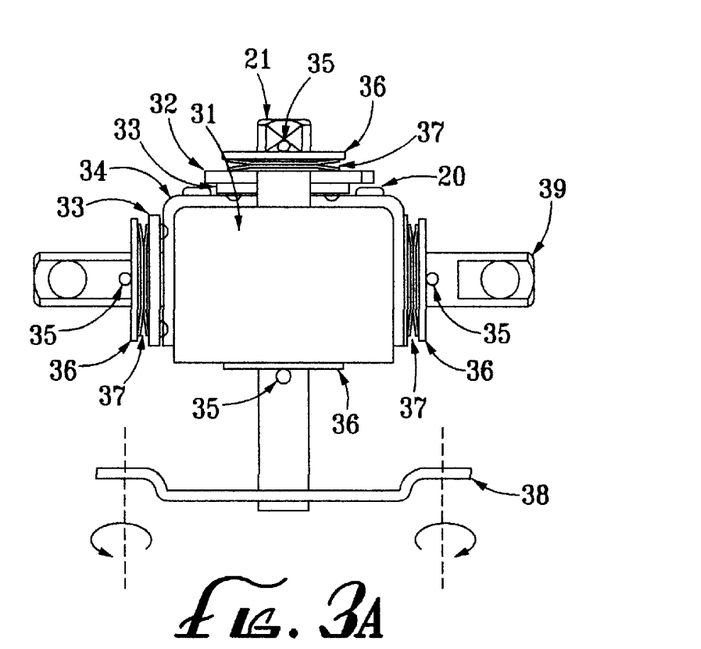
FIGS. 3(a)–(e) show the front, bottom, first side, top and second side views, respectively, of the hinge assembly in accordance with the present invention.
Figures 3B, 3C:
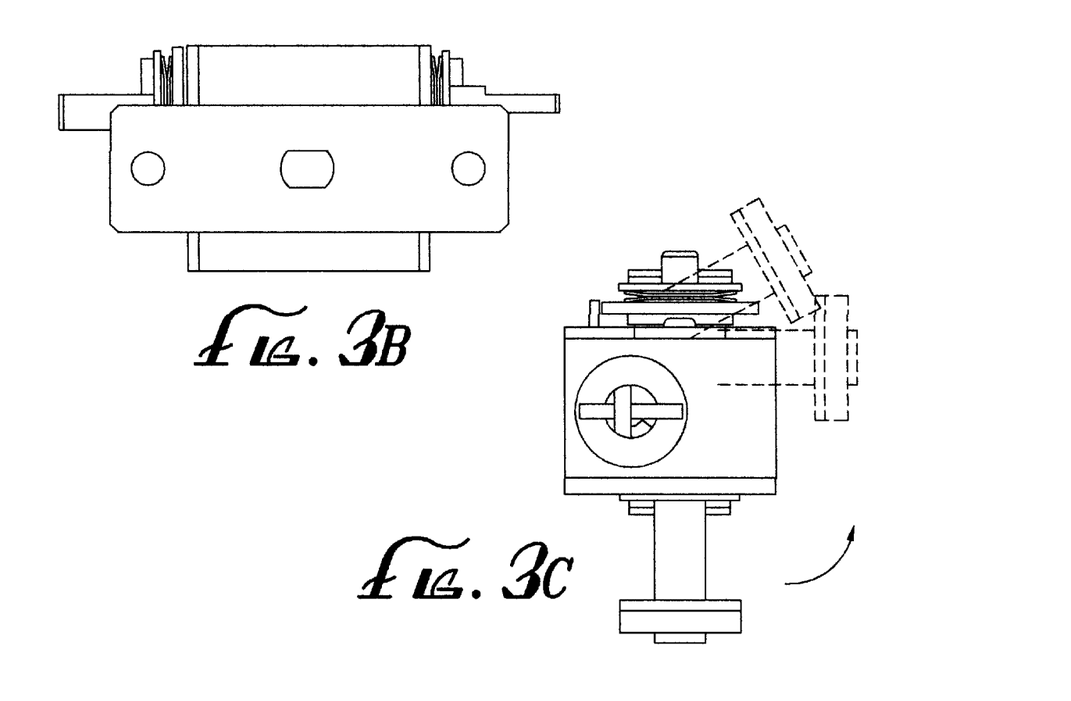
Figure 3D:
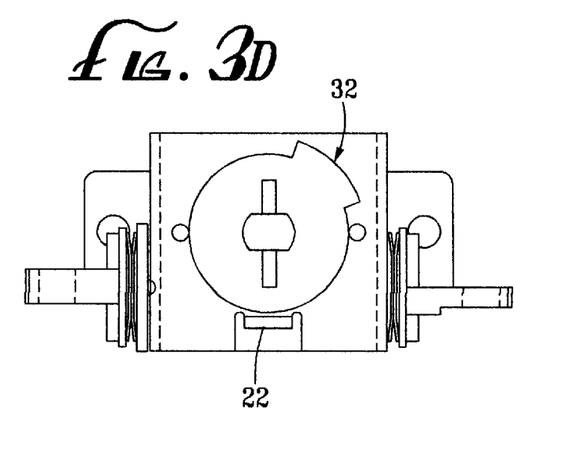
Figure 3E:
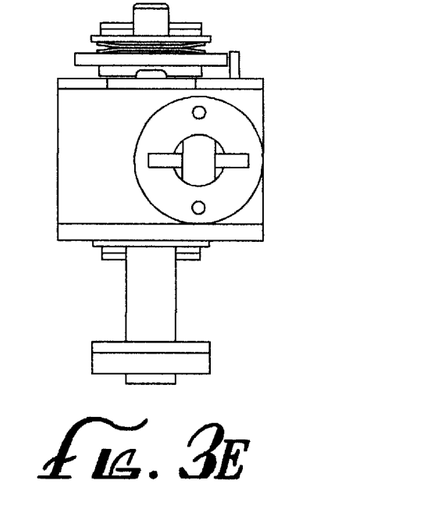

Reference is now turned to FIGS. 3(a)–(e), where the hinge assembly 18 is shown in more detail from different views. In FIG. 3(a), the body 31 provides a rigid structure to hold the open shaft 39 and rotate shaft 21 in their places.

Secured to the rotate shaft 21 by the spring pin 35, the washer 36 and the stopper 32 hold two dish springs 37 between them. Underneath the stopper 32, the click plate 33 works with the holder 34 to provide multiple positions for the rotate shaft 21, as the multiple semi-spherical, or "ball-shaped," extrusions of the click plate 33 move, or "click," from holes to holes on the holder 34. With force pushing from the dish springs 37, the click plate and holder will provide a secured engagement, until the passenger applies force to the shaft again.

It should be pointed out that while only one semi-spherical extrusion on the click plate 33 is generally sufficient to provide the "clicking" on the holes of holder 34, it is preferable to have multiple extrusions on the click plate to provide more stability and engagement. In the current implementation, the click plate has two such extrusions and the holder has four holes to provide rotation in 30-degree increments. That is, the screen, when facing the center of the back seat, can only be rotated horizontally to either left or right for another 30 degrees. While rotation around the B axis is possible, it may not be practical, if the passengers in the back seat are the primary users of the video display. The rotate unit 38 is used for attaching the screen unit to the hinge assembly.

The stopper 32 and stop 22, which is made of a strip of the holder 34 bent upward, provides a limitation for the rotate shaft's rotation span. When the uneven edge of the stopper 32 hits upon the stop 22, the rotate shaft will not rotate anymore. This combination controls how wide the rotation can be. The stopper 32 and stop 22 combination serves to prevent the rotate shaft from being rotated more than 360-degree in either direction, such that the wiring for the screen unit will not be twisted and tangled up. As can be appreciated by those skilled in the art, if the rotate shaft is continuously rotated beyond the 360-degree, possibly unintentionally by a viewer, the wiring becomes twisted and is likely to cause disconnect for any of the contact point, typically achieved by soldering. This stopper 32 and stop 22 combination, and the need thereof, is not addressed by the prior references, such as the Rosen reference. This stopper/combination can also be applied to the open shaft, although there is generally a limit, i.e. the interior ceiling of the automobile, for the screen to be pivoted in that axis.

It should be noted that the current implementation, as shown in the Figures, has the stopper/stop combination and the click plate 33 on the upper side of the body. This placement will provide more room at the lower end of the rotate shaft for the screen unit to be attached. However, those skilled in the art can easily determine the most appropriate way to implement the stopper/stop combination and the click plate, either at the same end or at different end, based on their own application.

A similar combination of the washer 36, dish springs 37 and click plate 33 can also be used for either or both ends of the open shaft 39, with the spring pins 35 securing them to the open shaft 39. This combination, with forces pushing from the dish spring, allows the screen unit to be securely positioned at a desired angle, whether it is for a child or for an adult in the back seat. If a stopper and stop combination is used for the open shaft 39, this combination can prevent the screen from being open beyond its desired angle and hitting the side of the video display console away from the cavity. It can also inhibit the close movement such that the screen is not slammed into the cavity, thus causing damages to the screen's surface.

As can be appreciated by those skilled in the art, the stopper/stop combination will protect the screen unit from being over-rotated in either direction, to prevent the wiring from becoming twisted. The dish spring/click plate/holder combination protects the screen's positions from the vibrations inherent in the movement of an automobile. Neither features have been taught by the references cited herein.

Figure 12A:
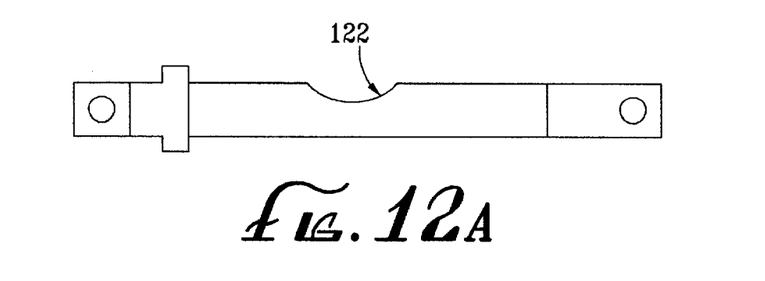
FIGS. 12(a)–(b) show the front and top views, respectively, of another open shaft for the hinge assembly.
Figure 12B:
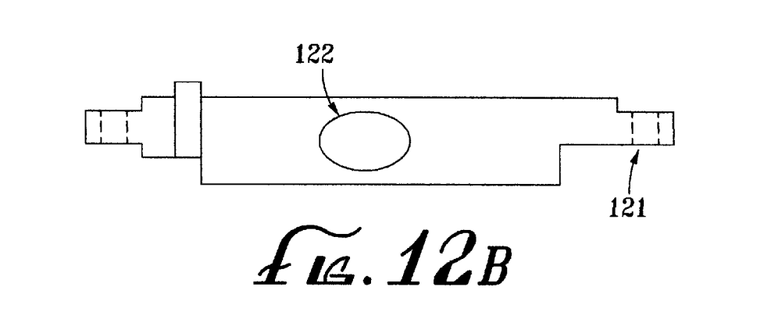
Figures 13A, 13B:
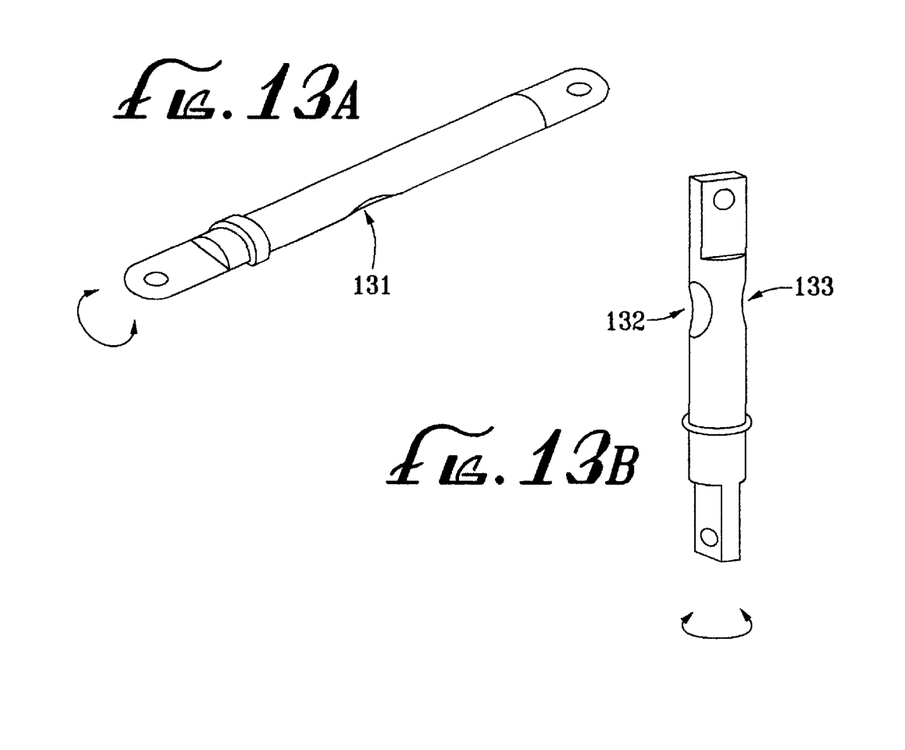
FIGS. 13(a)–(b) show the movement of the open shaft and rotate shaft.

As will be shown in FIGS. 12 and 13, the open shaft 39 and rotate shaft 21 are preferably interdependent by making curved recesses on both shafts. While the two shafts are held in a perpendicular position by the body 31, the rotate shaft 21 can only be rotated when it is in contact with the curved recess on the open shaft 39. Similarly, the open shaft 39 can only pivot when the shaft is in contact with the curved recess on the rotate shaft. This interdependence will prevent a deployed screen unit from being pushed back, whether accidentally or intentionally, to the cavity, when the screen is rotated about its B axis. This is another safety feature unresolved by the references cited herein.

Figure 4A:
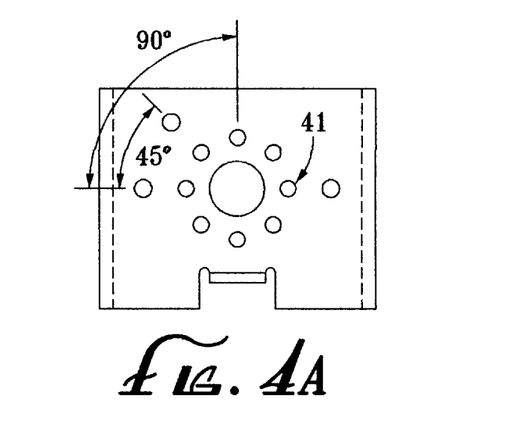
FIGS. 4(a)–(d) show the top, first side, front and second side views, respectively, of the holder for the hinge assembly.

Reference is to FIGS. 4(a)–(d), where the holder 34 is shown in more detail with different views. FIG. 4(a) shows a view from the top, with holes 41, or indentations if not completely punched through, are placed at 45-degree increments, or steps, for the click plate 33 to engage. As shown in this diagram, the rotate shaft 21 can be rotated in 45-degree steps to achieve better horizontal viewing angle for the viewers. Those skilled in the art can readily determine the best increments, or steps, to place the indentations. As previously described, movement by the click plate can be made subject to the limitation placed imposed by the stopper 32 and stop 22.

Figure 4B:
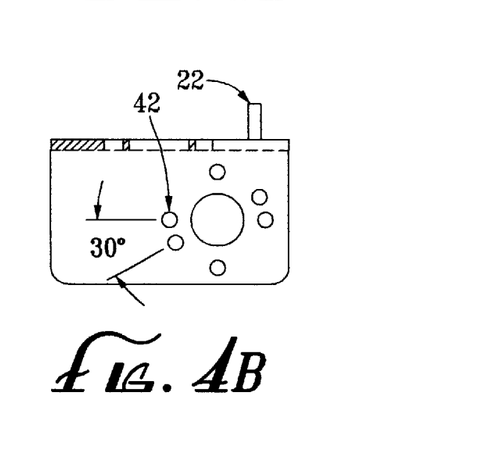
Figure 4C:
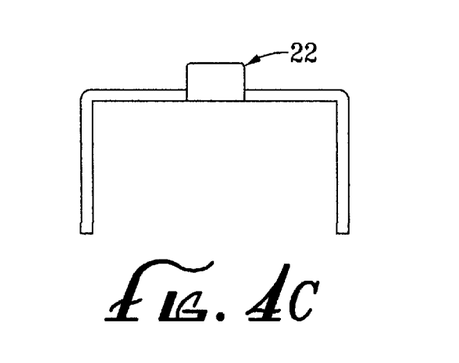

FIG. 4(b) shows a side view of the holder 34. The holes 42, or indentations, are placed to control the angles of the open shaft 39. As shown in this diagram, the open shaft 39 has 3 positions for its click plate 33 to engage, i.e. a stowed position at a horizontal plane, say at 0 degree, a first deployed position at a downward 90 degree angle from the horizontal plane, and a second deployed position at a downward 150 degree angle from the horizontal plane. This additional deployed position provides a better viewing angle for children in the back seat. Of course, those skilled in the art can readily determine different ways to modify the placement of the holes 42, or indentations, based on their intended application.

It should be noted that while the holes 41 and 42, or indentations, provide positions for the click plate to engage in a secured and stable way, the open shaft and rotate shaft are still free to stop without regard to the holes 41 and 42, or indentations. In such cases, the stops will not be as stable and are subject to the vibrations and bumps due to the movement of the vehicle. Neither the Rosen reference nor the Audiovox product teaches using click plates to maintain the stability of the screen unit. Instead, the conventional way of using friction-and-torque movement is less reliable and stable in view of the vibrations from the vehicle.

Figure 4D:
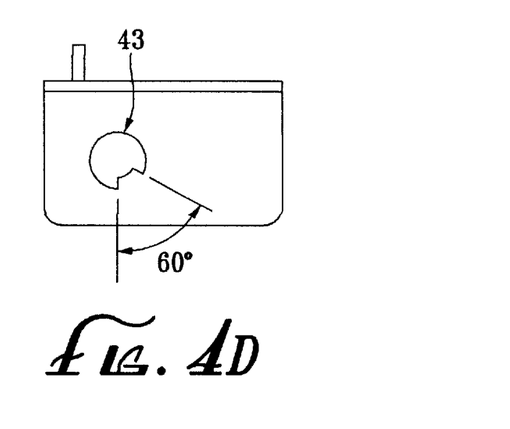
Figure 9A:
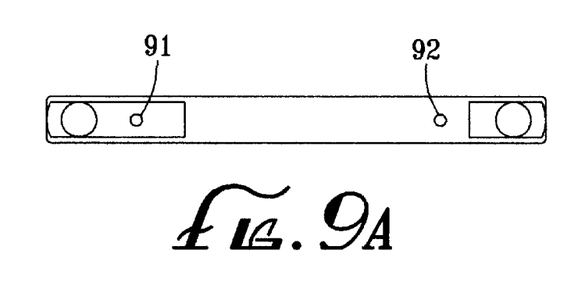
FIGS. 9(a)–(d) show the front, top, left side and right side views, respectively, of one embodiment of the opening shaft for the hinge assembly.
Figure 9B:
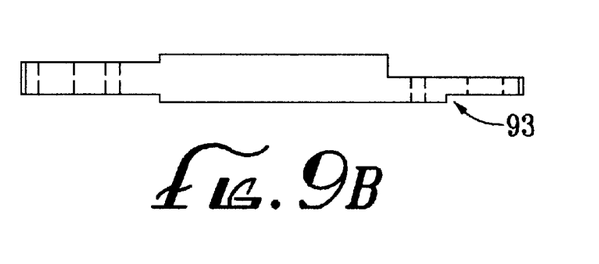
Figure 9C:
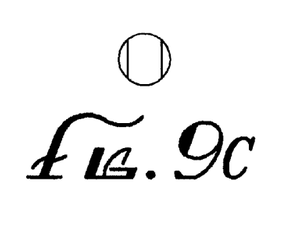
Figure 9D:
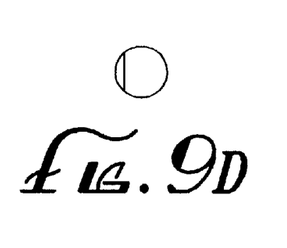

FIG. 4(d) shows another side view of the holder, with another stopper 43 to control the rotation span of the open shaft 39. Here, a 60-degree angle is "carved out" from one end of the passage through which the open shaft 39 is inserted. Of course, a portion of the end of the open shaft 39 that comes out of this passage needs to be modified to have a different and smaller size (as shown in FIGS. 9(a)–(b), 93; FIG. 12(b), 121) to use this stopper 43.

Figure 5A:
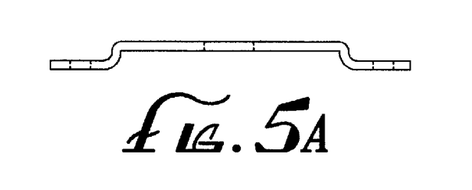
FIGS. 5(a)–(b) show the front and top views, respectively, of the rotate unit for use with the hinge assembly.
Figure 5B:
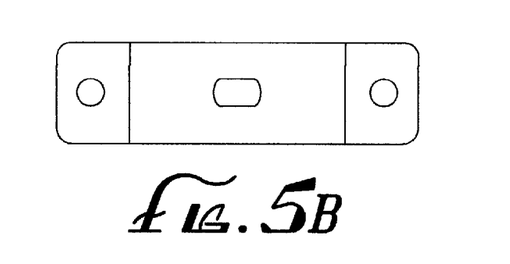

Reference is now turned to FIGS. 5(a)–(b), where the rotate unit 38 is shown. The rotate unit 38 is adapted to be attached to the rotate shaft 21 and to the screen unit. Those skilled in the art can readily find other rotate units that are suitable for their needs.

Figures 6A, 6B:
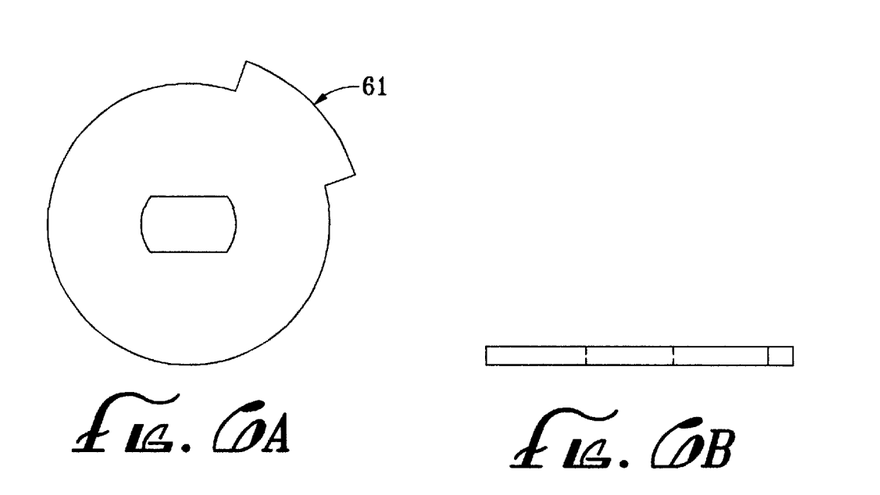
FIGS. 6(a)–(b) show the top and side views, respectively, of the stopper for use with the hinge assembly.

Reference is turned to FIGS. 6(a)–(b), where the stopper 32 is shown. Note that the uneven edge 61 can be made to provide various degrees of stoppage for the shaft's rotation.

Figure 7A:
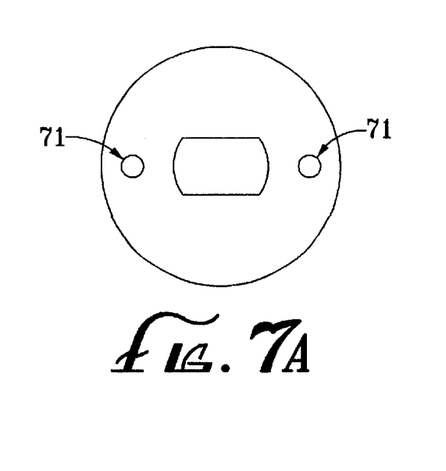
FIGS. 7(a)–(b) show the top and side views, respectively, of the click plate for use with the hinge assembly.
Figure 7B:
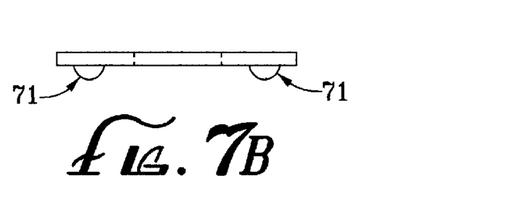
Figure 8A:
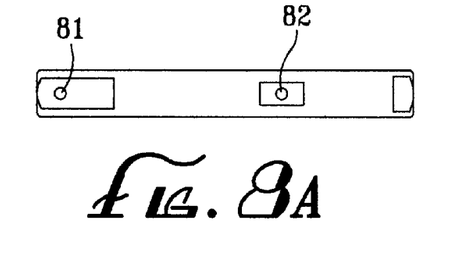
FIGS. 8(a)–(d) show the front, left, right and top views, respectively, of one embodiment of the rotate shaft for the hinge assembly.
Figure 8B:
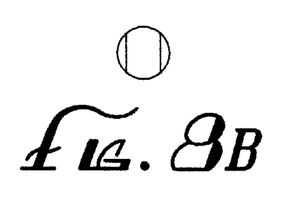
Figure 8C:
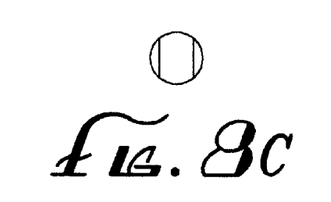
Figure 8D:
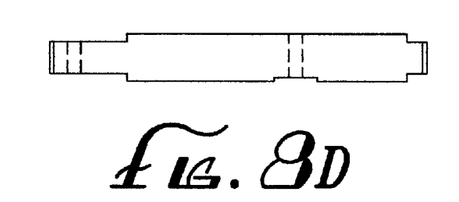

FIGS. 7(a)–(b) show the click plate 33 with two extrusions 71, or bumps, being placed opposite to each other. The extrusions can be stamped, or punched out, from the click plate, with a generally semi-spherical, or "ball-shaped," profile. With the aid of the dish spring 37, the extrusions 71, when placed into the holes 41 or 42 (or indentations) of the holder, provide a stable engagement so as to minimize the effect of any vibration from the vehicle's movement. Due to their generally semi-spherical profile, the extrusions 71 can be disengaged from their holes, if slightly forced by the viewer in the right direction. Of course, those skilled in the art can readily determine that more extrusions, or extrusions of different dimensions and profiles, may be used if different threshold of force is intended.

FIGS. 8(a)–(d) show one embodiment of the rotate shaft 21 in different views. Note that the holes 81 and 82 can be used for the spring pins 35 to secure the rotate shaft in the body 31.

FIGS. 9(a)–(d) show one embodiment of the open shaft 39 in different views. Note that the holes 91 and 92 can be used for the spring pins 35. Also, as previously described, the change in shape 93 can be used with the stopper 43 on the holder to control the rotation span of the open shaft, if so desired.

Figure 10A:
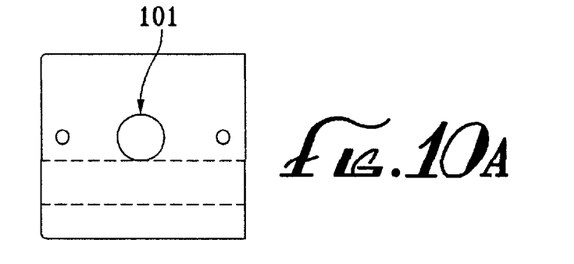
FIG. 10(a)–(c) show the top, front and side views, respectively, of the body for use with the hinge assembly.
Figure 10B:
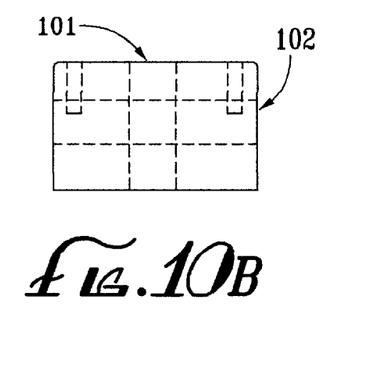
Figure 10C:
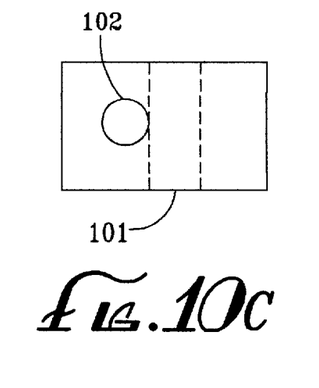

FIGS. 10(a)–(c) show one embodiment of the body 31 in various views. Note that the passage 101 is for the rotate shaft 21 and the passage 102 is for the open shaft 39. In this embodiment, the rotate shaft and open shaft are not interdependent. While their individual rotations are regulated by the click plate mechanism and/or stopper/stop mechanism, the open shaft 39 can be rotated from a deployed position to a stowed position, even when the rotate shaft 21 has the screen unit in a rotated position. In such a case, if the viewer continues to force-stow the screen unit, the screen unit is likely to be damaged. While the hinge assembly with this embodiment of the body has the advantages over the conventional hinges by use of the click plate, stopper/stop and/or dish springs, another embodiment (to be described in connection with FIGS. 14(a)–(c)) provides additional protective features for the screen unit.

Figure 11A:
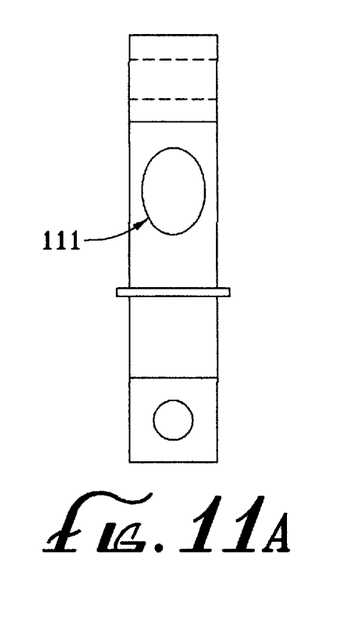
FIGS. 11(a)–(b) show the front and side views, respectively, of another rotate shaft for the hinge assembly.
Figure 11B:
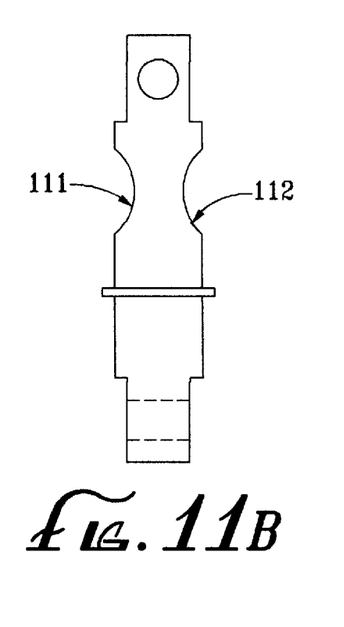

FIGS. 11(a)–(b) show another embodiment of the rotate shaft in front and side views. FIGS. 12(a)–(b) show another embodiment of the open shaft in front and top views. Note that the rotate shaft now has two generally curved recesses 111 and 112 on the body of the shaft. The open shaft also has a generally curved recess 122 on the body of the shaft. The recesses 111 and 112 on the rotate shaft, with the recess 122 on the open shaft provide the interdependence of the shafts when the two shafts are rotated as shown in FIGS. 13(a) and (b).

In FIGS. 13(a) and (b), in a stowed position, the recess 131 on the open shaft is adjusted to be away from the rotate shaft, while the recess 132 or 133 on the rotate shaft is touching the open shaft, such that the rotate shaft cannot be rotated, since any rotation is inhibited by the open shaft that is not recessed. However, the open shaft can still be rotated, since either one of the recesses 132 and 133 is touching the body of the open shaft and allowing the open shaft to pivot.

After the open shaft is rotated, i.e. the screen deployed, the recess 131 is now touching the rotate shaft, allowing the rotate shaft to be rotated. If the rotate shaft remains in a rotated positions, i.e. with its non-recessed body touching the recess 131 of the open shaft, the open shaft cannot be rotated toward the stowed position, since its movement is inhibited by the non-recessed portion of the rotate shaft.

Figure 14A:
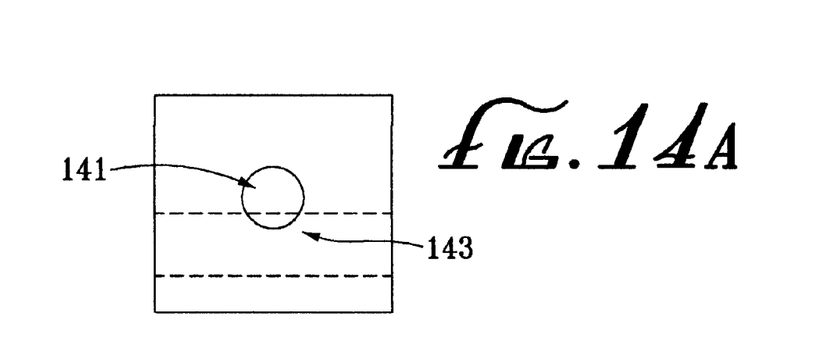
FIGS. 14(a)–(c) show another embodiment of the body with passages for the interdependent open shaft and the rotate shaft.
Figure 14B:
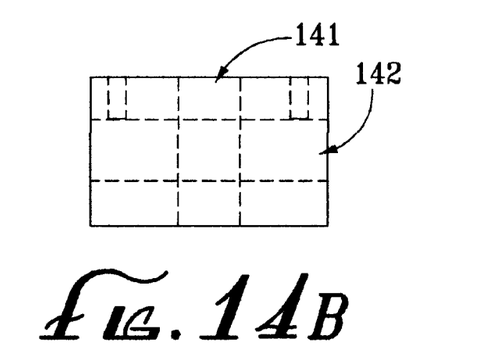
Figure 14C:
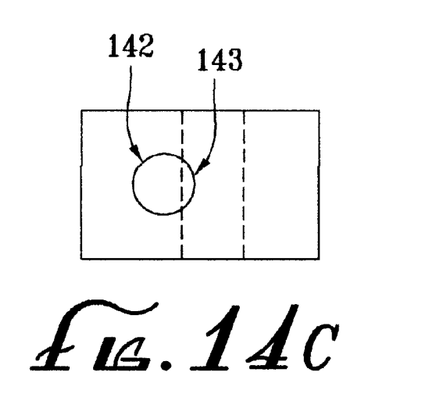

FIGS. 14(a)–(c) show another embodiment of the body, in different views, for use with the open and rotate shafts described in FIGS. 11–13. Note that the two passages 141 and 142 are situated such that they have a common face 143 such that the open shaft's recessed portion will allow the rotate shaft to rotate. And rotate shaft's non-recessed portion will inhibit the other shaft's movement, e.g. preventing the open shaft to be stowed while the screen unit is rotated. This common space of the intersecting passages provides for the interdependent movement of the open and rotate shafts. The recess on the shaft, when rotated to face the other passage, forms a unrestricted passage for the other shaft to rotate. The non-recessed portion of the shaft, when rotated to face the other passage, restricts the passage for the other shaft to rotate.

We claim:

1. A hinge assembly for mounting a screen of a video display to the interior of an automobile, comprising:

a body, adapted to couple the screen to the interior of the automobile;

an open shaft, with the generally middle portion of the open shaft coupled to the body and two ends of the open shaft adapted to be coupled to the interior of the automobile, said open shaft adapted to pivot the screen about a first axis;

a rotate shaft, with one end adapted to be coupled to the screen and a body portion of the rotate shaft coupled to the body, said rotate shaft adapted to pivot the screen about a second axis, transversal to the first axis;

at least one click plate attached to one end of the rotate shaft and the body, the click plate causing the rotate shaft to pivot with a plurality of stops to maintain stability of the screen about the second axis, the click plate comprising a first circular plate with a predetermined number of extrusions and a second circular plate with a predetermined holes, one of the first and the second plate being rigidly attached to the body;

at least one stopper attached to one end of the rotate shaft, the stopper adapted to cause the rotate shaft to stop rotation at a predetermined angle.

2. A hinge assembly according to claim 1, further comprising:

at least one dish spring, coupled to the rotate shaft, the dish spring adapted to secure the plurality of stops by forcing the first circular plate against the second circular plate to ensure engagement between the extrusions and the holes.

3. A hinge assembly according to claim 2, further comprising:

a second click plate attached to at least one end of the open shaft, the click plate adapted to cause the open shaft to pivot with a plurality of stops to maintain stability of the screen about the first axis.

4. A hinge assembly according to claim 3, further comprising:

a second stopper attached to at least one end of the open shaft, the stopper adapted to cause the open shaft to stop rotation at a predetermined angle.

5. A hinge assembly according to claim 1, further comprising:

a second click plate attached to at least one end of the open shaft, the click plate adapted to cause the open shaft to pivot with a plurality of stops to maintain stability of the screen about the first axis.

6. A hinge assembly according to claim 5, further comprising:

a second stopper attached to at least one end of the open shaft, the stopper adapted to cause the open shaft to stop rotation at a predetermined angle.

7. A hinge assembly for mounting a screen of a video display to the interior of an automobile, comprising:

a body, adapted to couple the screen to the interior of the automobile;

an open shaft, with the generally middle portion of the open shaft coupled to the body and two ends of the open shaft adapted to be coupled to the interior of the automobile, said open shaft adapted to pivot the screen about a first axis, the open shaft having a recess at the generally middle portion;

a rotate shaft, with one end adapted to be coupled to the screen and a body portion of the rotate shaft coupled to the body, said rotate shaft adapted to pivot the screen about a second axis, transversal to the first axis, the rotate shaft having at least one recess, the rotate shaft being in contact with the open shaft at their recesses;

wherein the recess on the open shaft allows the rotate shaft to rotate, the recesses on the rotate shaft allow the open shaft to rotate, the non-recess portion of the open shaft prevents the rotate shaft to rotate and the non-recess portion of the rotate shaft prevents the open shaft to rotate.

8. A hinge assembly according to claim 7, further comprising:

a click plate attached to at least one end of the rotate shaft, the click plate causing the rotate shaft to pivot with a plurality of stops to maintain stability of the screen about the second axis, the click plate comprising a first circular plate with a predetermined number of extrusions and a second plate with a predetermined holes, one of the first plate and the second plate being rigidly attached to the body.

9. A hinge assembly according to claim 8, further comprising:

a stopper attached to at least one end of the rotate shaft, the stopper causing the rotate shaft to stop rotation at a predetermined angle.

10. A hinge assembly according to claim 8, further comprising:

a click plate attached to at least one end of the open shaft, the click plate causing the open shaft to pivot with a plurality of stops to maintain stability of the screen about the first axis, the click plate comprising a first circular plate with a predetermined number of extrusions and a second plate with a predetermined holes, one of the first plate and the second plate being rigidly attached to the body.

11. A hinge assembly according to claim 10, further comprising:

a stopper attached to at least one end of the open shaft, the stopper causing the rotate shaft to stop rotation at a predetermined angle.

12. A hinge assembly for mounting a screen of a video display to the interior of an automobile, comprising:

a body, adapted to couple the screen to the interior of the automobile;

an open shaft, with the generally middle portion of the open shaft coupled to the body and two ends of the open shaft adapted to be coupled to the interior of the automobile, said open shaft adapted to pivot the screen about a first axis;

a rotate shaft, with one end adapted to be coupled to the screen and a body portion of the rotate shaft coupled to the body, said rotate shaft adapted to pivot the screen about a second axis, transversal to the first axis;

at least one click plate attached to one end of the open shaft and the body, the click plate causing the open shaft to pivot with a plurality of stops to maintain stability of the screen around the first axis, the click plate comprising a first circular plate with a predetermined number of extrusions and a second circular plate with a predetermined holes, one of the first plate and the second plate being rigidly attached to the body;

at least one stopper attached to one end of the open shaft, the stopper adapted to cause the rotate shaft to stop rotation at a predetermined angle.

13. A hinge assembly according to claim 12, further comprising:

at least one dish spring, coupled to the open shaft, the dish spring adapted to secure the plurality of stops by forcing the first circular plate and the second circular plate against toward each other to ensure engagement between the extrusions and the holes.

14. A hinge assembly according to claim 13, further comprising:

a second click plate attached to at least one end of the rotate shaft, the click plate adapted to cause the rotate shaft to pivot with a plurality of stops to maintain stability of the screen around the second axis.

15. A hinge assembly according to claim 14, further comprising:

a second stopper attached to at least one end of the rotate shaft, the stopper adapted to cause the rotate shaft to stop rotation at a predetermined angle.

16. A hinge assembly according to claim 12, further comprising:

a second click plate attached to at least one end of the rotate shaft, the click plate adapted to cause the rotate shaft to pivot with a plurality of stops to maintain stability of the screen around the second axis.

17. A hinge assembly according to claim 16, further comprising:

a second stopper attached to at least one end of the rotate shaft, the stopper adapted to cause the rotate shaft to stop rotation at a predetermined angle.

\* \* \* \* \*